US005512605A

United States Patent [19]
Eckberg et al.

[11] Patent Number: 5,512,605
[45] Date of Patent: Apr. 30, 1996

[54] ONE-PART UV-CURABLE EPOXY SILICONE COMPOSITIONS

[75] Inventors: Richard P. Eckberg, Saratoga Springs; Michael J. O'Brien, Clifton Park, both of N.Y.

[73] Assignee: General Electric Company, Waterford, N.Y.

[21] Appl. No.: 365,717

[22] Filed: Dec. 28, 1994

Related U.S. Application Data

[62] Division of Ser. No. 904,347, Jun. 25, 1992, Pat. No. 5,411,996.

[51] Int. Cl.⁶ .................. C08F 2/50; C08G 59/62; C08G 59/00; C08L 83/12
[52] U.S. Cl. .................. 522/31; 522/170; 528/14; 528/15; 528/16; 528/17; 528/18; 528/25; 528/27; 528/29; 528/40
[58] Field of Search .................. 522/31, 170; 528/14, 528/15, 16, 17, 18, 25, 27, 29, 40

[56] References Cited

U.S. PATENT DOCUMENTS

| | | | |
|---|---|---|---|
| 3,159,601 | 12/1964 | Ashby | 260/46.5 |
| 3,159,662 | 12/1964 | Ashby | 260/448.2 |
| 3,220,972 | 11/1965 | Lamoreaux | 260/46.5 |
| 3,516,946 | 6/1970 | Modic | 252/429 |
| 3,814,730 | 6/1974 | Karstedt | 260/46.5 |
| 4,029,629 | 6/1977 | Jeram | 260/375 B |
| 4,196,014 | 4/1980 | Taniyama et al. | 106/287.13 |
| 4,279,717 | 7/1981 | Eckberg et al. | 204/159.13 |
| 4,323,488 | 4/1982 | Takago et al. | 528/32 |
| 4,554,296 | 11/1985 | Keil | 521/154 |
| 4,576,999 | 3/1986 | Eckberg | 525/476 |
| 4,608,312 | 8/1986 | Eckberg et al. | 428/419 |
| 4,640,967 | 2/1987 | Eckberg | 528/26 |
| 4,684,670 | 8/1987 | Eckberg et al. | 522/13 |
| 4,882,201 | 11/1989 | Crivello et al. | 427/54.1 |
| 5,010,118 | 4/1991 | Desorcie et al. | 522/31 |
| 5,057,358 | 10/1991 | Riding et al. | 428/209 |
| 5,082,686 | 1/1992 | Desorcie et al. | 427/54.1 |
| 5,204,433 | 4/1993 | Wewers et al. | 528/12 |
| 5,227,410 | 7/1993 | Eckberg et al. | 522/75 |

*Primary Examiner*—Susan W. Berman

[57] ABSTRACT

Epoxysilicone polyether block copolymers, when combined with certain sulfonium photocatalysts, provide one-component shelf-stable UV curable compositions. Non-polyether containing epoxy silicones form one part UV curable compositions with sulfonium salt solubilized in the presence of fluoroalcohols.

9 Claims, No Drawings

ONE-PART UV-CURABLE EPOXY SILICONE COMPOSITIONS

This is a divisional of application Ser. No. 07/904,347 filed on Jun. 25, 1992, now U.S. Pat. No. 5,411,996.

BACKGROUND OF THE INVENTION

The present invention relates to epoxy-functional silicones. More particularly, the present invention relates to epoxy-functional silicones which in combination with a sulfonium salt photoinitiator form one part UV-curable compositions.

Ultraviolet radiation curable compositions containing epoxy-functional silicones and 'onium salt photocatalysts are known in the art. Reference is made, for example, to U.S. Pat. No. 4,279,717 (Eckberg et al.); U.S. Pat. No. 4,576,999 (Eckberg); and U.S. Pat. No. 4,640,967 (Eckberg).

Current applications of iodonium salt catalyzed UV-cure epoxysilicones have been limited to two-part compositions because the iodonium salts designed for miscibility with epoxysilicone polymers do not possess sufficient thermal stability to permit packaging them with the reactive epoxysilicones. Even at low concentrations, the photocatalyst and various additive packages promote gelation of the catalyzed polymers in a few days to a few weeks depending on storage conditions. It is therefore necessary for the end user to add the iodoniumphotocatalyst to the epoxysilicone polymer immediately before use. While this has not been a problem for some coating applications, other UV cure coating applications such as conformal coatings, optical fiber coatings, and various high-viscosity silicone uses of this sort are best served with a one-component product. Such a product is easy to use, and, more importantly, avoids potential contamination from mixing equipment or the entrainment of persistent air bubbles in the coating bath.

Although the epoxy-functional silicones disclosed in the patents recited above form excellent UV-curable compositions, it is continually desirable to provide improved UV-curable epoxy-functional compositions. For example, it is particularly desirable to provide shelf stable one part UV curable epoxy-functional coating compositions.

In addition, it is desirable to provide epoxy-functional silicones which are more miscible with certain 'onium salt photoinitiators than currently used UV-curable epoxy-functional compositions.

SUMMARY OF THE INVENTION

In one embodiment, the present invention is based upon the discovery that epoxy-functional silicone materials combined with polyethers form block copolymers which when combined with a sulfonium salt catalyst form shelf stable one-part UV curable compositions. In another embodiment, the sulfonium salt catalyst, without the polyethers, may be rendered miscible in epoxy-functional silicone materials in the presence of fluoro alcohols to provide shelf stable one part UV curable compositions.

The present invention provides a one part UV curable composition comprising:

(A) epoxy-functional silicones; and
(B) epoxy-functional polyether silicone copolymers having the general formula:

$$M^E D_x D'O(PEO)_y D'D_x M^E$$

where $M^E$ is

E is an alkyl epoxide radical,

D is $R_2SiO$,

D' is $RR'SiO$,

R' is $-CH_2CH_2-$, x is up to about 400, y ranges from about 1 to about 50, and B has a viscosity from about 10 to about 10000 cstk; or a mixture of (A) and (C) a co-curable fluorinated organic molecule; and (D) a sulfonium catalyst having the general formula:

$$R^3_3S^+M_N^-$$

where radicals represented by $R^3$ can be the same or different organic radicals from 1 to 30 carbon atoms, including aromatic carbocyclic radicals of from 6 to 20 carbon atoms which can be substituted with from 1 to 4 monovalent radicals selected from $C_{(1-18)}$ alkoxy, $C_{(1-8)}$ alkyl, nitro, chloro, bromo, cyano, carboxy, mercapto, and the like, and also including aromatic heterocyclic radicals including, e.g., pyridyl, thiophenyl, pyranyl, and the like, and $MX_n-$ is a non-basic, non-nucleophilic anion, such as $BF_4-$, $PF_6-$, $AsF_6-$, $SbF_6-$, $SbCl_6-$, $HSO_4-$, $ClO_4-$, and the like.

or mixtures of (A), (B), (C) and (D).

Preferred fluorinated organic molecules which may be co-cured with the epoxy-functional silicones include, but are not limited to, fluorine-containing aliphatic alcohols having from 1 to about 10 carbon atoms, and polyols, acrylates, epoxies and vinyl ethers. To be most effective, these fluorinated compounds must be miscible with the epoxysilicones and with the 'onium salt photoinitiators.

The epoxy-functional silicone compositions described above form UV-curable compositions having a fast cure at low UV radiation levels and improved shelf life.

DESCRIPTION OF THE INVENTION

The present invention is directed to novel one component UV curable epoxy-functional and polyether silicone block copolymers; and epoxy-functional silicones and fluorinated organic molecule blends curable in the presence of sulfoniumcatalysts to form fast curing shelf stable compositions.

(A) the epoxy-functional silicones of the present invention are selected from the group consisting of:

(I) linear epoxy-functional silicones having the general formula

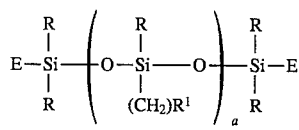

(II) linear epoxy-functional silicones having the general formula

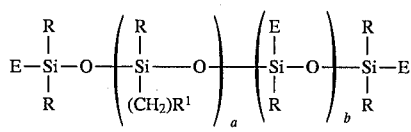

(III) resinous epoxy-functional silicones having the general formula

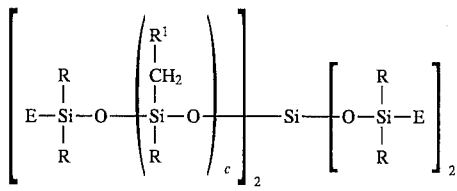

and (IV) resinous epoxy-functional silicones having the general formula

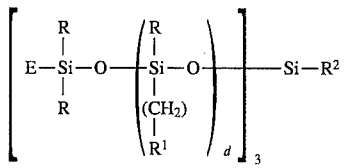

wherein E represents an epoxy-functional organic group of from about 2 to about 20 carbon atoms, R represents an alkyl radical having from 1 to about 10 carbon atoms, $R^1$ represents either a hydrogen atom or an alkyl radical having from about 1 to 8 carbon atoms, $R^2$ represents an alkyl radical having from 1 to about 10 carbon atoms, "a" represents a number from 0 to about 400, "b" represents a number from 1 to about 100, "c" represents a number from 0 to about 100, and "d" represents a number from 0 to about 100.

Preferably, in formulas (I)–(IV), E represents an epoxy-functional organic group of from 2 to about 20 carbon atoms. Preferably, E represents the radical

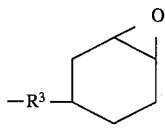

wherein $R^3$ is an alkylene radical having from 1 to about 10 carbon atoms, and most preferably an ethylene radical.

$R^1$ in formulas (I)–(IV) above is a hydrogen atom or an alkyl radical having from 1 to about 8 carbon atoms.

In formulas (I)–(IV) R and $R^2$ each represent an alkyl radical having from 1 to about 10 carbon atoms, preferably methyl. The value for "a" is a number from 0 to about 400, preferably from 0 to about 100, and more preferably from about 10 to about 75; "b" is a number from 1 to about 100, preferably from about 3 to about 30, and more preferably from about 5 to about 20; "c" is a number from 0 to about 100, preferably from about 1 to about 20, and more preferably from about 1 to about 10; and "d" is a number from 0 to about 100, preferably from about 1 to about 20, and more preferably from about 1 to about 10.

The epoxy-functional silicones of formula (I) can be prepared as follows. A silicone telomeric disiloxanol of the general formula $HO[(R^1CH_2)(R)SiO]H$ is agitated with an organic solvent, e.g., toluene, under a blanket of nitrogen, and to the resulting mixture are added incremental amounts of dimethylchlorosilane. After addition of the organochlorosilane is complete, the reaction mixture is heated to a temperature in the range of from about 80 to about 90° C. for about 2 to about 3 hours. The reaction mixture is washed with water until free of acid and then vacuums tripped to remove the solvent and water. The resultant fluid has a hydride content of from about 0.07 to about 0.15% by weight and the formula

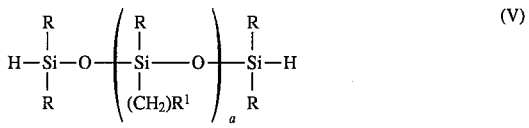

wherein R, $R^1$, and "a" are as previously defined.

The hydride-functional silicone of formula (V) is mixed with an organic solvent, e.g., toluene, and the resulting mixture is heated to a temperature of from about 50° to about 70° C. Then, an organic solvent solution containing 4-vinylcyclohexeneoxide (VCHO) which had been previously blended with an amount of a platinumcatalyst sufficient to provide from about 1 to about 10 parts per million (ppm) of platinum metal based on the total weight of the composition, is added to the hydride-functional silicone of formula (V) over a period of time ranging from about 10 to about 30 minutes. The reaction mixture is maintained at a temperature of from about 60° to about 70° C., for about 1 to about 12 hours. The organic solvent and unreacted VCHO are removed from the reaction product by vigorous agitation at a temperature of about 60° to about 120° C. for about 1 hour under a nitrogen sweep. The resulting product is an epoxy-functional silicone having the formula (I) set forth above.

Alternatively, epoxy-functional silicones having formula (I) can be prepared by hydrosilation addition of VCHO to a SiH-function silicone polymer of formula (V) which has been prepared by means of acid-catalyzed equilibration of octamethylcyclotetrasiloxane and 1,1,3,3-tetramethyl-disiloxane, a method well-known to those skilled in the art. Suitable acid catalysts for this equilibration include acid-treated clays, sulfuric acid/carbon black heterogeneous catalysts, or trifluoromethanesulfonic acid.

The epoxy-functional silicone of formula (II) can be readily prepared by VCHO addition to an SiH-functional silicone, designated (VI) below, prepared via acid catalyzed equilibration of octamethylcyclotetrasiloxane, 1,1,3,3-tetramethyldisiloxane, and 1,3,5,7-tetramethylcyclotetrasiloxane. As noted above, several different acid catalysts are effective for equilibration of SiH-containing siloxanes.

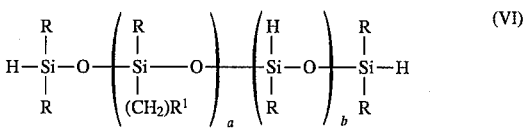

wherein R, $R^1$, "a" and "b" are as previously defined.

The hydride-functional silicone of formula (VI) is mixed with an organic solvent, e.g., toluene, and the resulting mixture is heated to a temperature of from about 50° to about 70° C. Then, an organic solvent solution containing 4-vinylcyclohexeneoxide (VCHO) which had been previously blended with an amount of a platinum catalyst sufficient to provide from about 1 to about 10 parts per million (ppm) of platinum metal based on the total weight of the composition, is added to the hydride-functional silicone of formula (VI) over a period of time ranging from about 10 to about 30 minutes. The reaction mixture is maintained at a temperature of from about 60° to about 70° C., for about 1 to about 12 hours. The organic solvent and unreacted VCHO are removed from the reaction product by vigorous agitation at a temperature of about 60° to about 120° C. for about 1 hour under a nitrogen sweep. The resulting product is an epoxy-functional silicone having the formula II as described above.

The epoxy-functional silicone resin of formula (III) can be prepared in the following manner. Methyldichlorosilane and dimethyldichlorosilane are dissolved in dry toluene while under a nitrogen blanket. Tetraethyl-orthosilicate is added with agitation to the resulting mixture. After addition of the orthosilicate, the mixture is stirred for about 15 to about 30 minutes and then added incrementally to distilled water. External cooling is applied to keep the temperature at about 40° C. When the reaction subsides to about 25° C., the mixture is allowed to phase separate. The organic phase is then washed with water until the pH is about 6. The material is then heated while agitating under a slight nitrogen purge to a temperature of about 115° C. in order to remove solvent, water, and alcohol. The vessel temperature is then increased to about 150° C. over a period of about 2 to about 3 hours and additional distillate recovered. The temperature of the mixture is then increased to about 175° to about 180° C., with recovery of additional distillate. The material can then be filtered with Celite 545 and Fuller's earth in order to reduce acidity down to about 10 ppm. The resulting hydride product was a clear fluid typically having a hydride content of 0.14% by weight, a viscosity of about 64 centipoise at 25° C., and the following formula

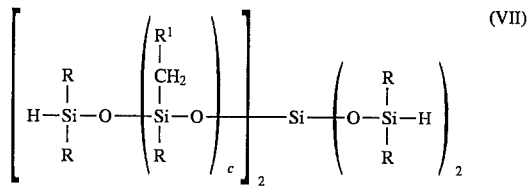

(VII)

wherein R, $R^1$, and "c" are as previously defined.

The hydride-functional silicone resin of formula (VII) is mixed with a solution of VCHO and the rhodium catalyst, $RhCl(Ph_3P)_3$, wherein "Ph" represents phenyl. The mixture is brought to a temperature of from about 90° to about 120° C. when sufficient VCHO is added dropwise to react with all silicon-bonded hydrogen groups (also referred to herein as "SiH") present in the resin and held there for about 1 to about 24 hours. A stabilizer, $CH_3N(C_{18}H_{37})_2$, is optionally added as a 10% solution in organic solvent, e.g., toluene. The organic solvent and excess VCHO are removed, e.g., by distillation at a temperature of 70° to about 140° C. under a nitrogen stream. The resulting product had the formula III as described above.

An epoxy-functional silicone of formula (IV) can be prepared as follows.

Methylhydrogendichlorosilane and dimethyldichlorosilane are dissolved in drytoluene while under a nitrogen blanket. Trimethoxymethylsilane is added with agitation to the resulting mixture. After addition of the trimethoxymethylsilane is complete, the mixture is stirred for about 20 to about 30 minutes and then added to distilled water. External cooling is applied to keep the temperature at about 40° C. When the reaction subsides to about 28° C., the mixture is allowed to phase separate. The organic phase is then washed with water until the pH is about 6. The material is then heated while agitating under a slight nitrogen purge to a temperature of about 148° C. in order to remove solvent, water, and alcohol. The vessel temperature is then increased to about 180° C. over a period of about 3 to about 4 hours and additional distillate recovered. The material can then be treated with Celite 545 and Fuller's earth in order to reduce acidity down to about 10 ppm. The resulting hydride product typically has a hydride content of 0.36% by weight, a viscosity of about 28.8 centipoise at 25° C., and the following formula

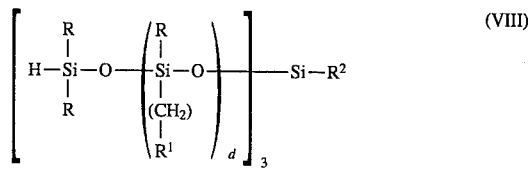

(VIII)

wherein R, $R^1$, $R^2$ and "d" are as previously defined.

The hydride-functional silicone of formula (VIII) is mixed with an organic solvent and a solution of $RhCl(Ph_3P)_3$ in 4-vinylcyclohexeneoxide. The mixture is brought to a temperature of from about 90 to about 120° C. when sufficient VCHO is added dropwise to react with all SiH present in the silicone resin solution, and held there for about 1 to about 24 hours. A stabilizer, methyldicocoamine in toluene, can be added. The stabilized reaction mixture is then stripped of solvent in vacuo at 70° to 160° C. The resulting product has the formula IV as described above.

Polyethers used to produce epoxysilicone polyether copolymers (B) in the invention may comprise dialkyl-stopped polyethelene oxide (PEO) having the general formula:

$$CH_2CH=CH_2-O(CH_2CH_2O)_xCH_2=CHCH_2$$

Structures corresponding to (B) are epoxy-functional-polyether silicone block copolymers of the invention having the general formula:

$$M^E D_x D'O(PEO)_y D'D_x M^E$$

where $M^E$ is preferably

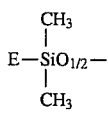

D is preferably

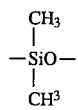

and

D' is preferably

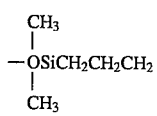

x is up to about 400, y ranges from about 1 to about 50; and (B) has a viscosity ranging from about 10 to about 10000 ctsk at 25° C.

(D), an alkoxy-functional poly(phenyl) 'onium catalyst, preferably a sulfonium salt such as

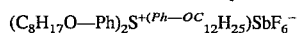

is employed in the present invention to produce a shelf stable catalyzed one component system in a blend with (B).

According to another embodiment of the invention, when (D) is combined with (A), it is necessary to solubilize the catalyst in the polymer.

(C) a co-curable fluoro containing molecule is advantageously provided to render (D) soluble in (A).

Fluorinated organic molecules which can be used to co-cure with the epoxysilicones include alcohols, polyols, acrylates, epoxies, vinyl ethers, and other fluoro-organic molecules which are miscible with the epoxysilicone and the 'onium salt catalyst, and co-curable under UV radiation in the presence of an 'onium salt catalyst. One preferred group of fluoro-organic molecules is fluorine-containing aliphatic alcohols having from 1 to about 10 carbon atoms. In the Examples below, the use of 1H,1H,5H-octafluoropentanol (OFP) and 1H,1H,7H-dodecylfluoroheptanol (DDFH) prove to be beneficial in enhancing the miscibility of sulfonium salts in an epoxy-silicone fluid.

A hydrosilation catalyst is used in the preparation of the epoxy-functional silicones of the present invention which promotes a hydrosilation reaction between the VCHO and the hydride-functional silicone. Useful catalysts for facilitating the hydrosilation curing reaction include precious metal catalysts such as those which use ruthenium, rhodium, palladium, osmium, iridium, and platinum, and complexes of these metals. Examples of suitable hydrosilation catalysts are disclosed, for example, in U.S. Pat. Nos. 3,159,601 and 3,159,662 to Ashby; 3,220,970 to Lamoreaux; 3,814,730 to Karstedt; 3,516,946 to Modic; and 4,029,629 to Jeram; all of the foregoing patents being incorporated by reference herein. Preferred rhodium catalysts are Wilkinson's Catalyst which has the formula $RhCl(Ph_3P)_3$, wherein "Ph" is phenyl, and $RhCl_3(R^1_2S)_3$, where $R^1$ has the meaning as previously described (as taught by Chandra et al., U.S. Pat. No. 3,928,629).

In one embodiment, any of the epoxy functional silicone polyether copolymers described herein may be combined with a sulfonium salt photocatalyst to form a shelf-stable one component uv-curable silicone composition.

In another embodiment, the invention is directed to UV co-curable compositions containing any of the epoxy-functional silicones described herein and a fluorinated organic compound in combination with a catalytic amount of sulfonium salt photoinitiator.

Photoinitiators suitable for use in this invention include those having the general formula:

$$R^3{}_3S^+MX_N^-$$

where radicals represented by $R^3$ can be the same or different organic radicals from 1 to 30 carbon atoms, including aromatic carbocyclic radicals of from 6 to 20 carbon atoms which can be substituted with from 1 to 4 monovalent radicals selected from $C_{(1-18)}$ alkoxy, $C_{(1-8)}$ alkyl, nitro, chloro, bromo, cyano, carboxy, mercapto, and the like, and also including aromatic heterocyclic radicals including, e.g., pyridyl, thiophenyl, pyranyl, and the like, and $MX_n$— is a non-basic, non-nucleophilic anion, such as $BF_4$—, $PF_6$—, $AsF_6$—, $SbF_6$—, $SbCl_6$—, $HSO_4$—, $ClO_4$—, and the like.

The preferred photocatalyst for use herein are sulfonium salts, and particularly $(C_6H_{17}O—Ph)_2S^+$; $(Ph—OC_{12}H_{25})$ $SbF_6^-$. The sulfonium salt may be prepared as set forth in U.S. Pat. Nos. 5,082,686 and 5,010,118.

Other examples of photocatalysts selected from 'onium salts are disclosed, for example, in U.S. Pat. No. 4,882,201 and U.S. Pat. 4,279,717, which are incorporated herein by reference. It should be understood, however, that the preferred sulfonium photocatalysts render the compositions shelf-stable and that such a characteristic is desirable.

The amount of catalyst present in the compositions of the present invention is not critical, so long as proper polymerization is effected. As with any catalyst, it is preferable to use the smallest effective amount possible, especially when shelf life is to be considered. For the purposes herein, catalyst levels of from about 0.5%–5.0% and preferably 1%–3% by weight have been found suitable.

The UV compositions of the present invention can be prepared by combining epoxy-functional silicones or epoxy-silicone-polyether copolymers with a sulfonium salt photoinitiator, as discussed above, and exposing the mixture to an amount of ultraviolet radiation sufficient to cure the composition. The UV curable compositions of the present invention have good cure efficiency coupled with good shelf stability. The UV curable compositions of the invention cure on exposure to UV radiation flux of as little as 13 mJ/cm$^2$, requiring a cure time of only about 0.1 seconds when two focused 300 watt/inch medium pressure mercury vapor UV lamps are used for cure. At the same time, an indefinite but durable shelf life of at least 7 months is achieved.

The present invention is further directed to articles of manufacture comprising a substrate having disposed on the surface thereof a coating containing a cured composition of the present invention having an epoxy functional, polyether block copolymer or an epoxy-functional silicone and a fluorinated organic molecule, or mixtures of both cured in the presence of a sulfonium salt.

The articles of the present invention are prepared by applying the curable compositions to a substrate if the composition is to be used as a conformal coating, and thereafter exposing the coated substrate to ultraviolet radiation sufficient to cure the composition.

In order that those skilled in the art might be better able to practice the present invention, the following examples are given by way of illustration and not by way of limitation.

EXAMPLE I 82.6 g of an organic siloxane material having the approximate formula $M^HD_{54}M^H$, 0.04 mole SiH, was dispersed in 100 g toluene with 5.4 g of diallyl-stopped polyethyleneoxide, approximate formula $CH_2=CHCH_2—O(CH_2CH_2O)_{10}CH_2CH=CH_2$, plus 0.03 g of a platinum catalyst. The reaction mixture was brought to 90° C., held at 80°–90° C. for an hour and infrared spectrum of the mixture was run before and after this reaction, from which the extent of SiH reaction was determined to be 51% based on the loss of the SiH peak at 2200 cm$^{-1}$. 2.5 g of 4-vinylcyclohexeneoxide (VCHO), 0.02 mole, was added. The reaction mixture was returned to 80° C. for an hour, when IR spectrum revealed that all SiH had been reacted. Removal of solvent in vacuo afforded an 82 g yield of 415 cstk fluid product, 99.0% solids, and $N_D^{25}=1.4110$. The average structure of this polymer is therefore $M^ED_{54}D'O(PEO)_{10}D'D_{54}M^E$, where

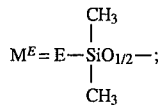

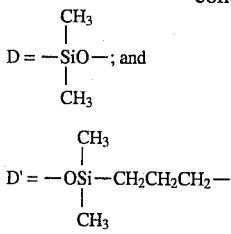

$$D = \begin{array}{c} CH_3 \\ | \\ -SiO- \\ | \\ CH_3 \end{array}; \text{ and}$$

$$D' = \begin{array}{c} CH_3 \\ | \\ -OSi-CH_2CH_2CH_2- \\ | \\ CH_3 \end{array}$$

EXAMPLE II 95 g of an linear SiH-functional silicone fluid ($MD_{15}D^H{}_4M$) was blended with 10 g of the same diallyl-stopped polyether used in Example I described above plus 10 g of a vinyl containing siloxane fluid ($M^{vi}D_{100}M^{vi}$). This mix was brought to 80° C., treated with 0.04 g of a platinum catalyst (sufficient to provide about 5 ppm Pt as Pt metal), then held at 80° C. for an hour. A homogeneous solution was obtained. 18 g of VCHO was then added to this reaction mixture at 80° C. and held at that temperature for two hours, at which point infrared examination of the solution detected no SiH peak. Removal of solvent and other light ends in vacuo afforded 126 g yield of a 739 cstk viscosity fluid. This material contains about 8% polyether as a block.

A sulfonium salt photocatalyst having the formula $(C_6H_{17}O-PH)_2S^+Ph-OC_{12}H_{25}SbF_6^-$ was prepared. This sulfonium salt is a viscous oil.

1 wt % of the sulfonium catalyst was dispersed into the polyether-containing epoxysilicones of Batch I and Batch II by heating the mixtures for a brief time on a hot plate, then vigorously mixing melted photocatalyst and the silicone together. In each case, a slightly hazy solution was obtained, which appeared to be stable at room temperature over an approximately 6 month period.

An attempt was made to blend the photocatalyst with a non-polyether containing epoxysilicone (an epoxy functional PDMS having an EEW of about 1000) in the same fashion. An opaque fluid was obtained from which the sulfonium salt rapidly precipitated as the mixture cooled.

2 mil coatings of Example I and the photocatalyst and 0.5 mil coatings of Example II and the photocatalyst were manually applied to polyethylene kraft paper (PEK), then passed through a RPC UV lab Processor, with lamp power and line speed varied until the minimum UV flux necessary to cure the coatings to smear- and migration-free condition was determined. The coating based in Example II required 83 $mJ/cm^2$ UV flux for cure; the coating based in Example I required 157 $mJ/cm^2$ UV flux for cure.

As a control, 1% solutions of (4-octyloxyphenyl)(phenyl)iodoniumhexafluoroantimonate in Example I and II were prepared as slightly hazy, stable blends, which cured to smear- and migration-free coatings in the same fashion as the sulfonium-catalyzed mixtures above on exposure to 63 and 126 $mJ/cm^2$ UV flux, respectively. The faster cure of the iodonium-catalyzed polymers compared to that of the sulfonium-catalyzed polymers is likely due to the much higher molecular weight of the sulfonium salt vs the iodonium species tested.

Samples of all four 'onium-catalyzed baths described above were maintained in the dark at ambient temperature, and separately placed in an oven at 100° C.. The iodonium-catalyzed epoxysilicone materials set up to solid gels in 2–4 weeks held at room temperature but set up in less than 10 minutes at 100° C. The sulfonium based epoxysilicone materials aged for over 6 months at room temperature with no sign of any viscosity build or gel. The same materials showed no evidence of gelling after 6 hours at 100° C., strongly suggesting that they retain their utility as coating compositions for several months or years.

One-component UV curable epoxysilicone compositions according to one embodiment of the invention have been shown to be feasible provided the epoxysilicones are modified with polyether blocks to render the polymers miscible with sulfonium salts which themselves have been specially modified with long-chain alkoxy substituents. The photo curable mixtures of these materials are thermally stable yet may be efficiently crosslinked on exposure to low levels of UV light.

EXAMPLE III 10 g of an epoxy-functional polydimethylsiloxane (EEW 1000) was blended with 2.3 g 1H,1H,5H-octafluoropentanol (OFP) to create a clear, homogeneous solution. 0.1 g of the sulfonium catalyst, $(C_8H_{17}O-Ph)_2S^+(Ph-OC_{12}H_{25})SbF_6^-$, was added by heating the silicone/OFP blend above the catalyst softening point, then agitating until a clear solution was obtained. This mixture proved to be stable, with no indication of sulfonium salt dropping out of solution over a period of two weeks at room temperature.

EXAMPLE IV

The same blend as in Example III above was prepared, then treated with 1 wt % $(4-C_8H_{17}Oph)I^+Ph\ SbF_6^-$.

A similarly clear, homogeneous solution was obtained.

Samples of the two catalyzed mixtures were then cured as 2 mil coatings on PEK substrates. The coating mixture of Example III cured to a glossy, smear- and migration-free 2 mil coating on irradiation with only 13 $mJ/cm^2$ total UV flux (one pass through the RPC Processor at 400 fpm with 300 watts/inch total UV lamp power). This is an exceptionally fast UV cure response. The absence of basic polyether blocks plus the cure-accelerative effect of the fluoro-alcohol additive both promote rapid cure. The control composition of Example IV with the iodonium salt catalyst cured even faster, requiring only 9 $mJ/cm^2$ UV flux.

Samples of each material of Example III and IV were then put into sealed glass vials and placed in a dark oven at 70° C. The composition of Example III showed no sign of cure after 24 hours at the elevated temperature. The composition of Example IV set up to a hard, solid gel within 30 minutes. The OFP-epoxysilicone mixture with compatible sulfonium salt photocatalyst is thermally stable despite its remarkable UV cure efficiency, unlike the comparable iodonium catalyzed mixture.

While there have been described what at present are considered to be the preferred embodiments of the present invention, it will be readily apparent to those skilled in the art that various changes may be made therein without departing from the invention and it is intended in the claims to cover such changes and modifications as fall within the true spirit and scope of the invention.

What is claimed:

1. An ultraviolet radiation-curable epoxy-functional silicone composition comprising:

(A) an epoxy-functional silicone selected from the group consisting of:

(I) linear epoxy-functional silicones having the general formula:

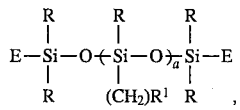

(II) linear epoxy-functional silicones having the general formula:

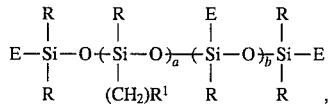

(III) resinous epoxy-functional silicones having the general formula:

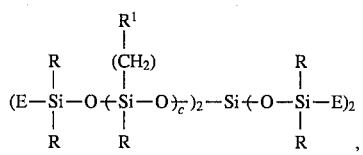

and (IV) resinous epoxy-functional silicones having the general formula:

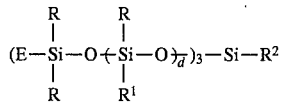

wherein E represents an epoxy-functional group of from about 2 to 20 carbon atoms, R represents an alkyl radical having from 1 to about 10 carbon atoms, $R^1$ represents a hydrogen atom or an alkyl or perfluoroalkyl radical having from about 1 to about 8 carbon atoms, $R^2$ represents an alkyl radical having from 1 to about 10 carbon atoms, "a" represents a number from 0 to about 400, "b" represents a number from 1 to about 100, "c" represents a number from 0 to about 100, and "d" represents a number from 0 to about 100;

(D) a co-curable fluoro-containing organic molecule wherein said fluoro containing organic molecule is miscible with both said epoxy-functional silicone (A) and a sulfonium salt photocatalyst; and (E) a catalytic amount of a sulfonium salt photocatalyst whereby said composition is curable upon exposure to ultraviolet radiation; whereby said composition has a shelf stability of at least seven weeks at room temperature.

2. The cured composition of claim 1.

3. An article of manufacture comprising a substrate having disposed on the surface thereof the curable composition of claim 1.

4. In an ultraviolet curable composition where
(A) is selected from the group consisting of:
(I) linear epoxy-functional silicones having the general formula:

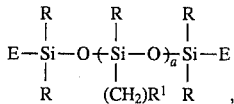

(II) linear epoxy-functional silicones having the general formula:

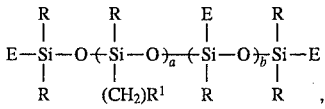

(III) resinous epoxy-functional silicones having the general formula:

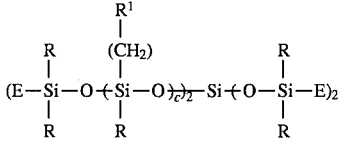

(IV) resinous epoxy-functional silicones having the general formula:

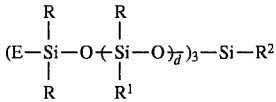

wherein E represents an epoxy-functional group of from about 2 to 20 carbon atoms, R represents an alkyl radical having from 1 to about 10 carbon atoms, $R^1$ represents a hydrogen atom or an alkyl or perfluoroalkyl radical having from about 1 to about 8 carbon atoms, $R^2$ represents an alkyl radical having from 1 to about 10 carbon atoms, "a" represents a number from 0 to about 400, "b" represents a number from 1 to about 100, "c" represents a number from 0 to about 100, and "d" represents a number from 0 to about 100;

(B) is an epoxysilicone polyether block copolymer having the formula:

$$M^E D_x D'O(PEO)_y D'DM^E$$

where:
i) $M^E$ is $R_2ESiO_{1/2}$ with E an alkylepoxide radical,
ii) D is $R_2SiO$,
iii) D' is $R_2SiOCH_2CH_2CH_2—$,
iv) PEO is polyethylene oxide, x ranges up to about 400 and y ranges from about 1 to about 50 wherein (B) has a viscosity ranging from 10 to about 10,000 centistokes and where R is as previously defined;

a curable composition comprising;
1) an epoxysilicone selected from the group consisting of (A), (B) and mixtures thereof;
2) a sulfonium salt photocatalyst having the general formula:

$$R^3{}_3S^+MX_n{}^-$$

where $R^3$ is independently selected from the group of organic radicals having from 1 to 30 carbon atoms and $MX_n{}^-$ is a non-basic, non-nucleophilic anion selected from the group consisting of tetrafluoroborate, hexafluorophosphate, hexafluoroarsenate, hexafluoroantimonate, hexachloroantimonate, bisulfate, and perchlorate; and 3) a co-curable fluoro-containing organic molecule wherein said fluoro-containing organic molecule is miscible with both said epoxysilicone and said sulfonium salt photocatalyst; whereby said composition has a shelf stability of at least seven weeks at room temperature.

5. The cured composition of claim 4.

6. An article of manufacture comprising a substrate having disposed on the surface thereof the curable composition of claim 4.

7. A one part ultraviolet curable composition comprising a mixture of:

1) an epoxysilicone polyether block copolymer having the formula:

$$M^E D_x D'O(PEO)_y D'DM^E$$

where:
   i) $M^E$ is $R_2ESiO_{1/2}$ with E an alkylepoxide radical,
   ii) D is $R_2SiO$,
   iii) D' is $R_2SiOCH_2CH_2CH_2-$,
   iv) PEO is polyethylene oxide, x ranges up to about 400 and y ranges from about 1 to about 50 wherein said epoxysilicone polyether block copolymer has a viscosity ranging from 10 to about 10,000 centistokes and where R represents an alkyl radical having from 1 to about 10 carbon atoms; and 2) a sulfonium salt photocatalyst having the general formula:

$$R^3{}_3S^+MX_n{}^-$$

where $R^3$ is independently selected from the group of organic radicals having from 1 to 30 carbon atoms and $MX_n{}^-$ is a non-basic, non-nucleophilic anion selected from the group consisting of tetrafluoroborate, hexafluorophosphate, hexafluoroarsenate, hexafluoroantimonate, hexachloroantimonate, bisulfate, and perchlorate; whereby said composition has a shelf stability of at least seven weeks at room temperature.

8. The one part UV curable composition of claim 7, wherein the epoxy-functionality of said epoxysilicone polyether block copolymers is derived from 4-vinylcyclohexeneoxide (VCHO).

9. The one part UV curable composition of claim 7, wherein the polyether segment of said epoxysilicone polyether copolymer is derived from diallylstopped polyethylene oxide.

* * * * *